United States Patent
Matsuoka et al.

(10) Patent No.: US 9,783,022 B2
(45) Date of Patent: Oct. 10, 2017

(54) VEHICLE AIR-CONDITIONING SYSTEM AND VEHICLE AIR-CONDITIONING METHOD

(71) Applicant: Nissan Motor Co., Ltd., Kanagawa (JP)

(72) Inventors: Takayoshi Matsuoka, Kanagawa (JP); Kenichiro Minami, Kanagawa (JP); Takafumi Uehara, Kanagawa (JP)

(73) Assignee: NISSAN MOTOR CO., LTD., Kanagawa (JP)

( * ) Notice: Subject to any disclaimer, the term of this patent is extended or adjusted under 35 U.S.C. 154(b) by 178 days.

(21) Appl. No.: 14/428,564

(22) PCT Filed: Aug. 14, 2013

(86) PCT No.: PCT/JP2013/071904
§ 371 (c)(1),
(2) Date: Mar. 16, 2015

(87) PCT Pub. No.: WO2014/041953
PCT Pub. Date: Mar. 20, 2014

(65) Prior Publication Data
US 2015/0210140 A1    Jul. 30, 2015

(30) Foreign Application Priority Data
Sep. 14, 2012  (JP) ................ 2012-202339

(51) Int. Cl.
*B60H 1/00* (2006.01)
*B60H 1/22* (2006.01)
*B60H 1/26* (2006.01)

(52) U.S. Cl.
CPC ..... *B60H 1/00735* (2013.01); *B60H 1/00207* (2013.01); *B60H 1/00778* (2013.01);
(Continued)

(58) Field of Classification Search
CPC ........... B60H 1/00778; B60H 1/00742; B60H 1/00842; B60H 1/00735; B60H 1/00207; B60H 2001/00214
(Continued)

(56) References Cited

U.S. PATENT DOCUMENTS 5,524,446 A    6/1996  Hotta et al.
5,572,881 A   11/1996  Hotta et al.
(Continued)

FOREIGN PATENT DOCUMENTS

JP    5-147420 A    6/1993
JP    6-20113 U     3/1994
(Continued)

OTHER PUBLICATIONS

International Search Report issued in corresponding application No. PCT/JP2013/071904, mailed Nov. 19, 2013 (6 pages).
(Continued)

*Primary Examiner* — Davis Hwu
(74) *Attorney, Agent, or Firm* — Osha Liang LLP (57) ABSTRACT

A vehicle air-conditioning system has an intake door that switches between an inside air recirculation mode to take in air from an inside air introduction port and an outside air introduction mode to take in air from an outside air introduction port, a blower that blows the air introduced through any of the inside air introduction port and the outside air introduction port toward inside of a vehicle cabin, a heater that heats the air blown by the blower, and a controller that activates the heater when there is a request for heating the inside of the vehicle cabin, controls air conditioning such that an environment inside the vehicle cabin becomes a desired environment by set estimated time of departure.

7 Claims, 4 Drawing Sheets

(52) U.S. Cl.
CPC ..... *B60H 1/00849* (2013.01); *B60H 1/00885* (2013.01); *B60H 1/00892* (2013.01); *B60H 1/2218* (2013.01); *B60H 1/26* (2013.01); *B60H 2001/00214* (2013.01); *B60H 2001/2234* (2013.01)

(58) Field of Classification Search
USPC .......................................... 165/42, 43, 203
See application file for complete search history.

(56) References Cited

U.S. PATENT DOCUMENTS

| | | | | |
|---|---|---|---|---|
| 5,725,052 | A * | 3/1998 | Kawai | ................ B60H 1/00064 165/203 |
| 6,352,102 | B1 * | 3/2002 | Takechi | ............. B60H 1/00064 165/203 |
| 7,082,990 | B1 * | 8/2006 | Uemura | ............. B60H 1/00849 165/203 |
| 2005/0056413 | A1 * | 3/2005 | Homan | .................. B60H 1/004 165/203 |

FOREIGN PATENT DOCUMENTS

| | | |
|---|---|---|
| JP | H08-230441 A | 9/1996 |
| JP | 2006-248386 A | 9/2006 |
| JP | 2006-298326 A | 11/2006 |
| JP | 2009-173203 A | 8/2009 |

OTHER PUBLICATIONS

International Preliminary Report on Patentability issued in corresponding application No. PCT/JP2013/071904, issued Dec. 9, 2014 (7 pages).

\* cited by examiner

VEHICLE AIR-CONDITIONING SYSTEM AND VEHICLE AIR-CONDITIONING METHOD

CROSS-REFERENCE TO RELATED APPLICATIONS

The present application is a national stage application of PCT Application No. PCT/JP2013/071904, filed Aug. 14, 2013, and claims foreign priority to Japanese Patent Application No. 2012-202339, filed on Sep. 14, 2012, the entire contents of which are incorporated herein in entirety by reference.

BACKGROUND

Technical Field

The present invention relates to an air-conditioning system (a heating ventilation and air-conditioning system) and an air-conditioning method for a vehicle, and more specifically to a vehicle air-conditioning system configured to be activated before boarding of a passenger to provide comfortable space inside a vehicle at the time of boarding, and a vehicle air-conditioning method thereof.

Related Art

For a vehicle air-conditioning system, there has been known a technique to perform air conditioning before boarding (hereinafter referred to as preliminary air conditioning). Here, a user sets estimated time of departure and the air-conditioning system is automatically activated such that a temperature inside a vehicle cabin reaches a set temperature by the estimated time of departure (PTL 1, for example).

According to this conventional technique, the vehicle air-conditioning system prioritizes air conditioning around a driver's seat in order to efficiently condition the air inside the vehicle cabin with limited energy, by closing ventilators except those opened to the driver's seat side in preliminary air conditioning.

CITATION LIST

Patent Literature

Patent Literature 1: Japanese Patent Application Laid-Open Publication No. 2006-248386

SUMMARY

However, according to the technique described in PTL 1, window fogging may occur on a front windshield and the like when heating is performed in an inside air recirculation mode for reducing heat loss by ventilation under the requirement to perform the preliminary air conditioning with the limited energy. In such a case, if a driver gets in the vehicle before the estimated time of departure, the driver cannot put the vehicle in motion immediately.

One or more embodiments of the present invention provides a vehicle air-conditioning system and a vehicle air-conditioning method, which avoid occurrence of window fogging when heating is performed in air conditioning, thereby allowing a driver to put a vehicle in motion as soon as getting in the vehicle.

When there is a request for heating the inside of a vehicle cabin in air conditioning, a vehicle air-conditioning system and a vehicle air-conditioning method according to one or more embodiments of the present invention perform alternate switching between an inside air recirculation mode for a first predetermined time period and an outside air introduction mode for a second predetermined time period, by controlling inside-outside air switching means for switching between inside air and outside air.

DETAILED DESCRIPTION

Embodiments of the present invention will be described below in detail with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In one or more embodiments of the present invention, a vehicle that carries a vehicle air-conditioning system is an electric vehicle. The electric vehicle runs by using electric power of a battery which actuates a drive motor, thereby rotating drive wheels. Note that the vehicle carrying the vehicle air-conditioning system of one or more embodiments of the present invention may also be a vehicle equipped with an internal combustion engine, a hybrid vehicle which employs both an engine and a motor, a plug-in hybrid vehicle which can be recharged by an external power source, or a fuel cell vehicle driven by a fuel cell.

In order not to reduce mileage by consuming the power recharged in the battery, the preliminary air conditioning in one or more embodiments of the present invention is executed in a state where an external power source for recharge is connected to the electric vehicle, so that the electric power for the preliminary air conditioning is supplied from the external power source.

(Regarding Vehicle Air-conditioning System)

Figure 1:
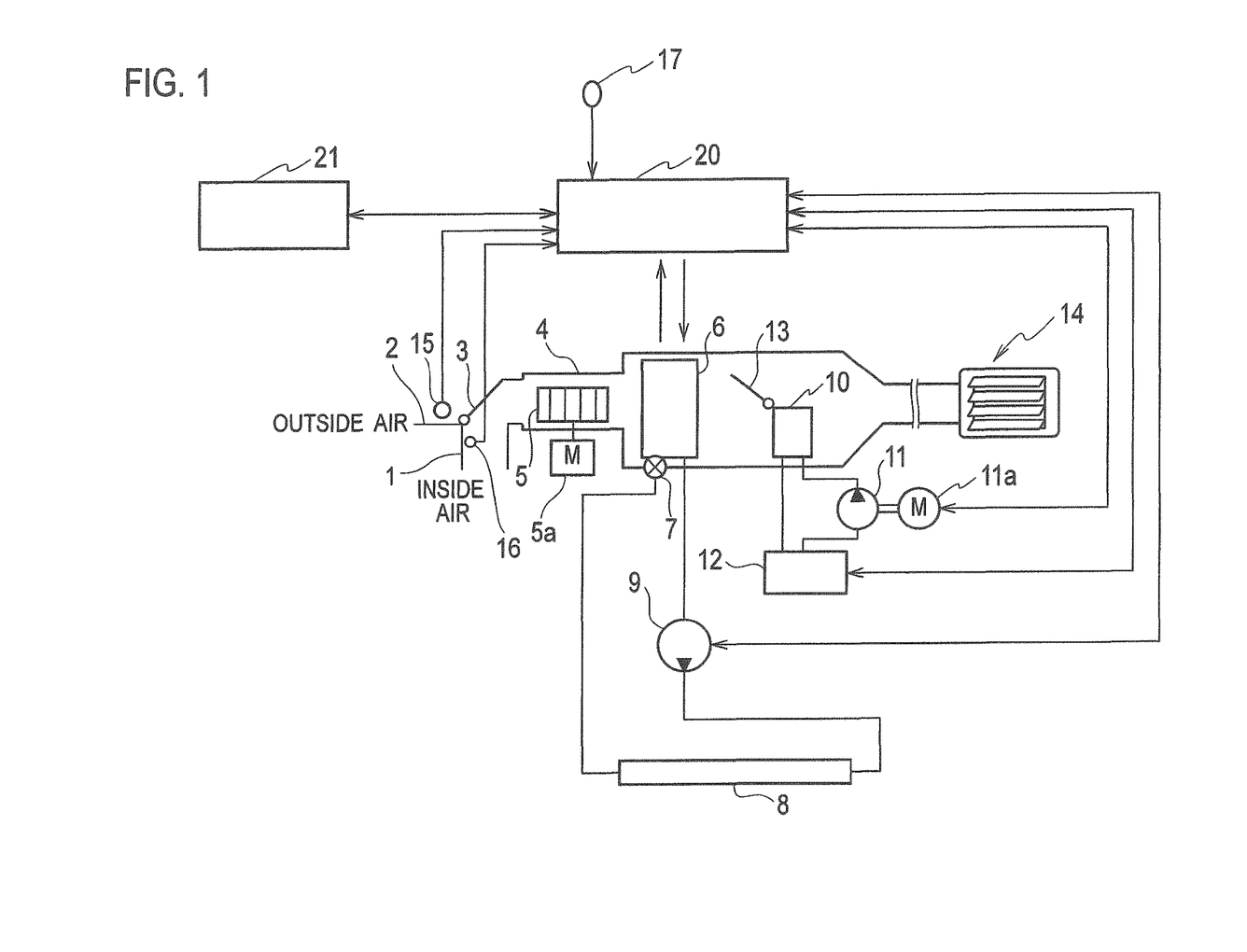
FIG. 1 is a system configuration diagram explaining a configuration of a vehicle air-conditioning system according to one or more embodiments of the present invention.

FIG. 1 is a system configuration diagram explaining a configuration example of a vehicle air-conditioning system according to one or more embodiments of the present invention. In FIG. 1, the vehicle air-conditioning system includes a heating ventilation and air-conditioning (HVAC) unit 4 configured to blast temperature-regulated air into a vehicle cabin. Moreover, the vehicle air-conditioning system includes: a cooling system as cooling means which is provided with an interior heat exchanger 6, an expansion valve 7, a condenser 8, and a compressor 9; and a heater system as heating means which is provided with a heater core 10, an electric water pump 11, and a PTC heater 12.

The heating ventilation and air-conditioning unit 4 includes: an inside air introduction port 1 configured to introduce air inside the vehicle cabin, and an outside air introduction port 2 configured to introduce outside air which is air outside the vehicle cabin, as respective air intake ports; and an intake door 3 as inside-outside air switching means for switching between the inside air introduction port 1 and the outside air introduction port 2. At the time of preliminary air conditioning, a state where the intake door 3 opens the inside air introduction port 1 and closes the outside air introduction port 2 is called an inside air recirculation mode, while a state where the intake door 3 opens the outside air introduction port 2 and closes the inside air introduction port 1 is called an outside air introduction mode.

The opening and closing of the intake door 3 is controlled as appropriate by an A/C controller 20, which is a control unit of the vehicle air-conditioning system, on the basis of an inside air mixing rate either set by a driver or requested by automatic air-conditioning control. The A/C controller 20 serves both as air-conditioning controlling means and as preliminary air-conditioning controlling means.

The air introduced from any of the air intake ports is supplied to the interior heat exchanger 6 by using a blower fan 5 driven by a motor 5a. The motor 5a that drives the blower fan 5 is actuated as appropriate by the A/C controller 20 on the basis of a blowing amount either set by the driver or requested by the automatic air-conditioning control.

(Regarding Cooling System)

The interior heat exchanger 6 constitutes the cooling system being the cooling means in conjunction with the expansion valve 7, the condenser 8, and the compressor 9. The cooling system cools the air by: causing a pressurized and liquefied coolant to vaporize and draw heat when the coolant is sprayed out of the expansion valve into the interior heat exchanger 6; and thereby performing heat exchange with the air circulating in the interior heat exchanger 6. The coolant after completion of the heat exchange in the interior heat exchanger 6 is compressed by the compressor 9 which is an electric coolant compression device. The compressor 9 is driven by a not-illustrated electric motor and is provided with a compressing capability that corresponds to the power supplied thereto.

The coolant compressed by the compressor 9 and thus increased in temperature is then subjected to heat radiation and cooling by the condenser 8 and thus liquefied, which is then supplied again into the interior heat exchanger 6 by means of the expansion valve 7. The cooling system itself has a well-known configuration and its detailed descriptions will therefore be omitted.

(Regarding Heater System)

Having passed through the interior heat exchanger 6, the air is supplied to the heater core 10 located downstream of an air passage and is subjected to heating. The heater system includes the heater core 10, the PTC heater 12, and the pump 11. Warm water flows through the heater core 10. The heater core 10 heats the air by exchanging the heat between the introduced air and the warm water. The pump 11 is driven by an electric motor 11a, and circulates the warm water between the heater core 10 and the PTC heater 12.

The PTC heater 12 is a heating element that uses a resistor having a positive temperature coefficient characteristic. When the PTC heater 12 is driven at a constant voltage, its resistance value is increased along with a rise in temperature, and an amount of its heat generation is decreased by a reduction in electric current. Accordingly, the PTC heater 12 has a function that when its temperature rises and reaches a predetermined temperature, the PTC heater 12 maintains that temperature.

(Regarding Air-Conditioning Function)

An air mix door 13 provided immediately in front of the heater core 10 has a function to control a proportion of the air to pass through the heater core 10 out of the air having passed through the interior heat exchanger 6. The A/C controller 20 controls the aperture of the air mix door 13, and thus regulates the temperature of the air blasted from ventilators 14 into the vehicle cabin to a target temperature. Although FIG. 1 illustrates only one ventilator 14, multiple ventilators and defrosters (DEF) are in fact provided in the vehicle cabin, and the number of the ventilators to blast the conditioned air is controlled as appropriate in response to a blast mode either selected by the driver or requested by the automatic air-conditioning control.

When a mode with a large number of the ventilators is selected, an amount of the blasted air is increased whereby an air volume becomes larger. When a mode with a small number of the ventilators is selected, the amount of the blasted air is decreased whereby the air volume becomes smaller.

A display unit 21 provided with a touch panel is connected to the A/C controller 20. By means of the display unit 21, a user can input: an automatic or manual air-conditioning operating mode; switching between the inside air recirculation mode and the outside air introduction mode; a set air volume; a set temperature; selection of the ventilators for the conditioned air; a setting of activation/non-activation of the defrosters; and the like. Meanwhile, the user can input estimated time of departure for conducting the preliminary air conditioning, and a set temperature for the preliminary air conditioning if necessary from the display unit 21. In addition, the display unit 21 can display the air-conditioning mode, the set temperature, an inside temperature, an outside air temperature, the estimated time of departure, and the like.

Furthermore, an outside air temperature sensor 15 disposed in the vicinity of the outside air introduction port 2 and configured to detect the outside air temperature, an inside temperature sensor 16 disposed in the vicinity of the inside air introduction port 1 and configured to detect a temperature inside the vehicle cabin, and a solar radiation sensor 17 configured to detect an amount of solar radiation are connected to the A/C controller 20.

The A/C controller 20 is configured to: receive respective detection values from the outside air temperature sensor 15, the inside temperature sensor 16, and the solar radiation sensor 17; calculate a target blast temperature; and control the blower fan 5, the air mix door 13, the compressor 9, the PTC heater 12, and the electric water pump 11.

In addition, the A/C controller 20 can control the preliminary air conditioning by accepting preliminary air-conditioning settings from the display unit 21. The preliminary air conditioning is a function to operate the vehicle air-conditioning system at preset time so as to render a state inside the vehicle cabin comfortable before boarding. The preliminary air conditioning takes place in an ignition-off state. At the time of the preliminary air conditioning, the vehicle air-conditioning system is basically operated in the inside air recirculation mode (REC) in order to minimize power consumption by the air conditioning. In a cooling operation at the time of the preliminary air conditioning, the compressor 9 is turned on while the PTC heater 12 and the electric water pump 11 are turned off. In a heating operation at the time of the preliminary air conditioning, the compressor 9 is turned off while the PTC heater 12 and the electric water pump 11 are turned on. The display unit 21 displays presence or absence of the settings for the preliminary air conditioning, as well as air-conditioning states including the air volume, the set temperature, the number of the ventilators, and the like.

Although the PTC heater configured to heat the warm water is used in FIG. 1, a PTC heater provided at the position of the heater core 10 and configured to directly heat the air may also be used. Meanwhile, although the vehicle air-conditioning system uses the cooling system which includes one interior heat exchanger in the heating ventilation and air-conditioning unit 4, the vehicle air-conditioning system may also use a cooling system in which multiple heat exchangers are disposed in the heating ventilation and air-conditioning unit 4.

(Control of A/C Controller)

Next, the contents of control by the A/C controller 20, which is the control unit of the vehicle air-conditioning system of one or more embodiments of the present invention, will be described with reference to control flowcharts of FIGS. 2 to 5. Although it is not particularly limited to the following, in one or more embodiments of the present invention, the A/C controller 20 is formed from a microprocessor including a CPU, a work RAM, an EEPROM which is a non-volatile memory, and an input-output interface. Moreover, control functions of the A/C controller 20 are realized by causing the CPU to execute control programs stored in the EEPROM.

Figure 2:
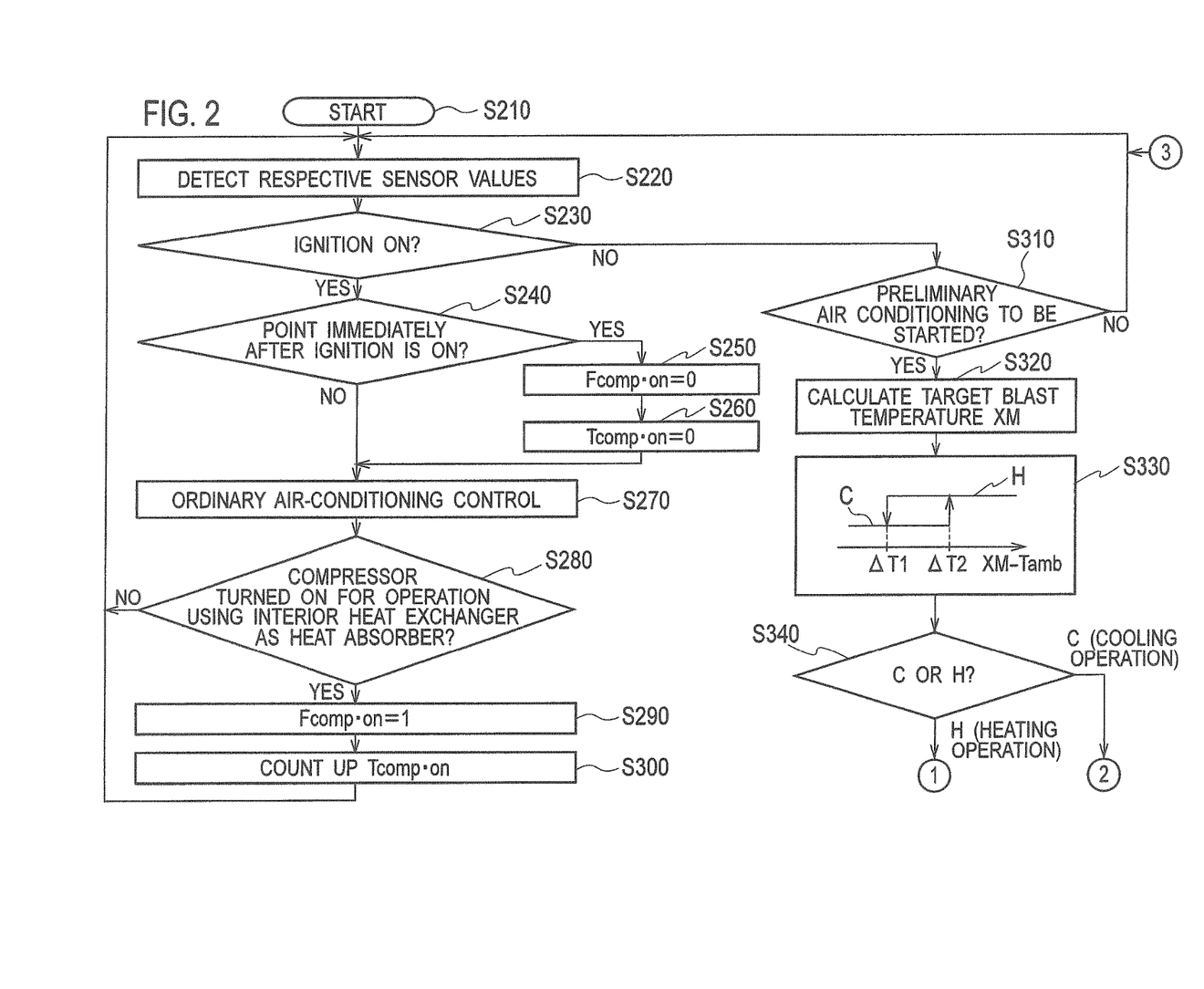
FIG. 2 is a control flowchart explaining contents of control in the vehicle air-conditioning system according to one or more embodiments of the present invention.

In FIG. 2, when the control is first started in step S210, the A/C controller 20 reads the detection values of the respective sensors in step S220. Specifically, the A/C controller 20 detects the outside air temperature from the outside air temperature sensor 15, detects the temperature inside the vehicle cabin from the inside temperature sensor 16, and detects the amount of solar radiation from the solar radiation sensor 17.

In step S230, the A/C controller 20 judges whether or not an ignition switch is located at an on position. When the ignition is on, the process proceeds to step S240 in order to perform ordinary air-conditioning control. The process proceeds to step S310 when the ignition is off. Here, the electric vehicle does not involve ignition of an internal combustion engine. Accordingly, a switch for turning on and off a power supply that supplies electric power from a drive battery is provided instead of the ignition switch. However, such a switch for turning the power supply on and off is also called the ignition switch due to the custom of conventional internal combustion engine-powered automobiles. Therefore, the switch for turning the power supply on and off will also be called the ignition switch in one or more embodiments of the present invention.

In step S240, a judgment is made whether or not it is a point immediately after the ignition is switched from off to on. The process proceeds to step S250 when it is the point immediately after the ignition is switched from off to on. The process proceeds to step S270 when it is not the point immediately after the ignition is switched from off to on.

In step S250, the A/C controller 20 resets a flag Fcomp.on, which is provided for representing that the compressor 9 is turned on, to 0 and the process proceeds to step S260.

In step S260, the A/C controller 20 resets a timer Tcomp.on, which is provided for counting a cumulative operating time period of the compressor 9, to 0 and the process proceeds to step S270.

In step S270, the A/C controller 20 performs the ordinary air-conditioning control. Here, the A/C controller 20 regulates the temperature in the inside to a set temperature by controlling the compressor 9, the PTC heater 12, the electric water pump 11, the blower fan 5, the air mix door 13, the intake door 3, and the ventilators 14.

In step S280, the A/C controller 20 judges whether or not the compressor 9 is turned on for an operation using the interior heat exchanger 6 as a heat absorber. The process proceeds to step S290 when the interior heat exchanger 6 is operated as the heat absorber. When the interior heat exchanger 6 is not operated as the heat absorber, the process returns to step S220 and the control is repeated.

In step S290, the A/C controller 20 sets the flag Fcomp.on for representing that the compressor 9 is turned on to 1, and the process proceeds to step S300.

In step S300, the A/C controller 20 counts up the timer Tcomp.on for counting the cumulative operating time period of the compressor 9, and the process returns to step S220 and the control is repeated.

When the ignition is judged to be off in step S230, the process proceeds to step S310.

In step S310, the A/C controller 20 judges whether or not the preliminary air conditioning is to be started. First, the A/C controller 20 judges whether or not the preliminary air conditioning is set. When the preliminary air conditioning is not set, the process returns to step S220 and the control is repeated. When the preliminary air conditioning is set, the A/C controller 20 judges whether or not the preliminary air conditioning is to be started. Specifically, the A/C controller 20 calculates time necessary for bringing the temperature inside the vehicle cabin to the set temperature by the preliminary air conditioning, on the basis of either the outside air temperature from the outside air temperature sensor 15 or the inside temperature from the inside temperature sensor 16, and of the amount of solar radiation from the solar radiation sensor 17. A method of calculating the time necessary for the preliminary air conditioning is publicly known as disclosed in Japanese Patent Application Laid-Open Publication No. H08-230441 and the like, and details thereof will be omitted. Thereafter, when current time indicated by a clock built in the A/C controller 20 reaches time that goes back from the estimated time of departure by the amount necessary for the preliminary air conditioning, the A/C controller 20 judges to start the preliminary air conditioning. The process proceeds to step S320 when the judgment to start the preliminary air condition is made. When the judgment to start the preliminary air conditioning is not made, the process returns to step S220 and the control is repeated.

In step S320, the A/C controller 20 calculates a target blast temperature XM on the basis of the amount of solar radiation as well as any of the outside air temperature and the inside temperature detected in step S220, and of the set temperature in the A/C controller 20.

In step S330, the A/C controller 20 selects an operating state out of a heating operation (H) and a cooling operation (C) on the basis of a temperature difference (XM-Tamb) between the target blast temperature XM calculated in step S320 and the outside air temperature Tamb detected in step S220. As shown in a graph in step S330, the heating operation (H) is selected when the temperature difference (XM-Tamb) is greater than a given value $\Delta T2$. The cooling operation (C) is selected when the temperature difference (XM-Tamb) is smaller than a given value $\Delta T1$. Furthermore, once the heating operation (H) is selected, the heating operation (H) is continued until the temperature difference (XM-Tamb) reaches the given value $\Delta T1$. Once the cooling operation (C) is selected, the cooling operation (C) is continued until the temperature difference (XM-Tamb) reaches the given value $\Delta T2$. As described above, a hysteresis characteristic is imparted to the selection of the operating state. This characteristic is provided in order to avoid frequent switching between the heating operation and the cooling operation in a state where the target blast temperature is close to the outside air temperature.

Figure 3:
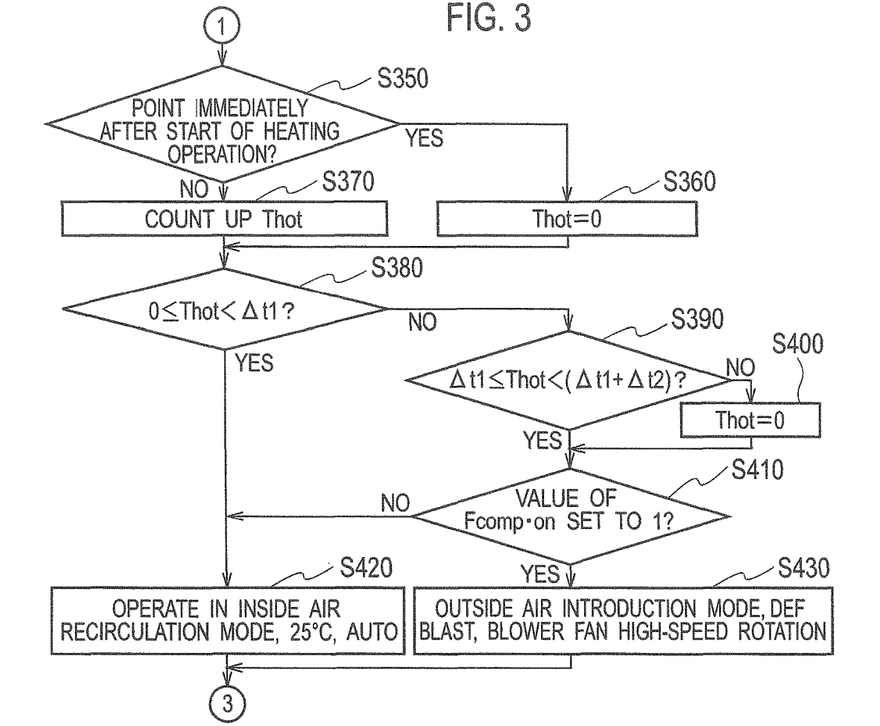
FIG. 3 is a control flowchart explaining the contents of control in the vehicle air-conditioning system according to one or more embodiments of the present invention.
Figure 4:
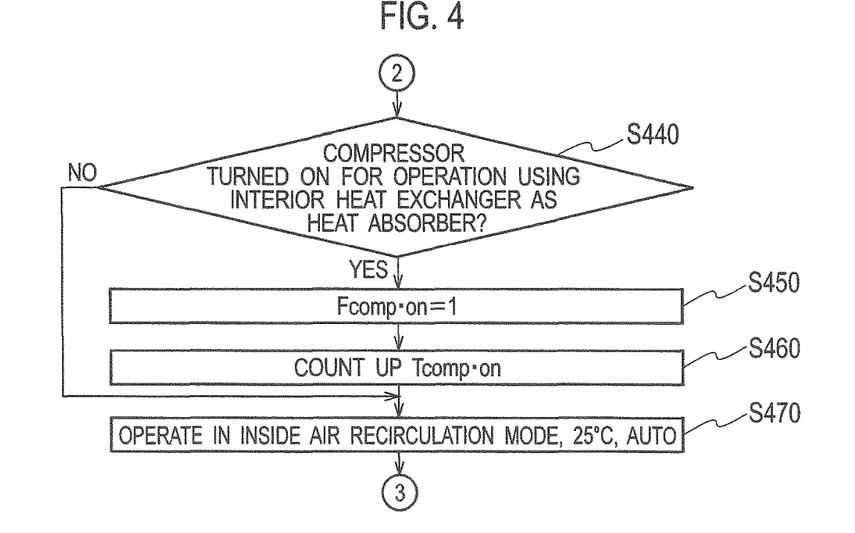
FIG. 4 is a control flowchart explaining the contents of control in the vehicle air-conditioning system according to one or more embodiments of the present invention.

In step S340, the process proceeds to either step S350 or S440 depending on the operating state selected in step S330. Specifically, the process proceeds to step S350 when the heating operation (H) is selected (FIG. 3). The process proceeds to step S440 when the cooling operation (C) is selected (FIG. 4).

In step S350, the A/C controller 20 judges whether or not it is a point immediately after a start of the heating operation. The process proceeds to step S360 when it is the point immediately after the start of the heating operation. The process proceeds to step S370 when it is not the point immediately after the start of the heating operation.

In step S360, the A/C controller 20 resets a timer Thot, which is provided for measuring a heating-operation time period in the preliminary air conditioning, to 0. A measurement value of the timer Thot is used for a judgment for switching between the inside air recirculation mode and the outside air introduction mode in the heating operation at the time of the preliminary air conditioning.

In step S370, the A/C controller 20 counts up the timer Thot for measuring the heating-operation time period in the preliminary air conditioning and the process proceeds to step S380.

In step S380, the A/C controller 20 judges whether or not the timer Thot is in a range of a first predetermined time period which is a range from 0 to $\Delta t1$. When the timer Thot is in the range of the first predetermined time period from 0 to $\Delta t1$, the process proceeds to step S420 in order to perform the heating operation in the inside air recirculation mode. The process proceeds to step S390 when the timer Thot is not in the range of the first predetermined time period from 0 to $\Delta t1$.

In step S390, the A/C controller 20 judges whether or not the timer Thot is in a range of a second predetermined time period which is a range from $\Delta t1$ to ($\Delta t1+\Delta t2$). The process proceeds to step S410 when the timer Thot is in the range of the second predetermined time period from $\Delta t1$ to ($\Delta t1+\Delta t2$). The process proceeds to step S400 when the timer Thot is not in the range of the second predetermined time period from $\Delta t1$ to ($\Delta t1+\Delta t2$), that is, when the timer Thot exceeds ($\Delta t1+\Delta t2$).

In step S400, the A/C controller 20 resets the timer Thot for measuring the heating-operation time period in the preliminary air conditioning to 0, since one cycle including the inside air recirculation mode for the first predetermined time period ($\Delta t1$) the outside air introduction mode for the second predetermined time period ($\Delta t2$) is completed.

In step S410, the A/C controller 20 judges whether or not the value of the flag Fcomp.on for representing that the compressor 9 is turned on is set to 1. When the value of the flag Fcomp.on is set to 1, there is a risk of occurrence of window fogging attributed to evaporation of condensed water (drain) adhering to the interior heat exchanger 6 because the interior heat exchanger 6 has been operated as the heat absorber by turning the compressor 9 on. For this reason, when the value of Fcomp.on is set to 1, the process proceeds to step S430 in order to avoid the window fogging. In step S430, the A/C controller 20 operates the vehicle air-conditioning system by setting the outside air introduction mode (FRE), defroster blast (DEF), and blower fan high-speed rotation (HI). When the value of the flag Fcomp.on is set to 0, there is little risk of occurrence of the window fogging attributed to evaporation of the condensed water adhering to the interior heat exchanger 6 since the interior heat exchanger 6 has not been operated as the heat absorber. For this reason, the process proceeds to step S420 when the value of Fcomp.on is set to 0. In step S420, the A/C controller 20 operates the vehicle air-conditioning system by setting the inside air recirculation mode (REC), a set temperature at 25° C., and an automatic mode (AUTO).

Based on the conditional judgments from step S380 to step S410, the A/C controller 20 alternately repeats the switching between the operation in the inside air recirculation mode in step S420 for the first predetermined time period ($\Delta t1$) and the operation in the outside air introduction mode in step S430 for the second predetermined time period ($\Delta t2$), during the heating operation in the preliminary air conditioning. Accordingly, moisture inside the vehicle cabin is discharged to the outside of the vehicle during the preliminary air conditioning. Thus, it is possible to maintain the state without occurrence of the window fogging when a passenger gets in the vehicle in the middle of the preliminary air conditioning.

The values $\Delta t1$ and $\Delta t2$ in step S380 and step S390 are corrected depending on the timer Tcomp.on for counting the cumulative operating time period of the compressor 9, the amount of solar radiation (Qsun), and the outside air temperature (Tamb) as shown in a flowchart of FIG. 5 to be described later.

In one or more embodiments of the present invention, the process proceeds to step S420 when the value of Fcomp.on is set to 0, and the vehicle air-conditioning system is operated by setting the inside air recirculation mode (REC), the set temperature at 25° C., and the automatic mode (AUTO). Nevertheless, the process may proceed to step S430 even when the value of Fcomp.on is set to 0. In other words, the process may proceed to step S430 irrespective of the judgment result on Fcomp.on in step S410, and the A/C controller 20 may perform the operation by setting the outside air introduction mode (FRE), the defroster blast (DEF), and the blower fan high-speed rotation (HI).

Meanwhile, although the operation at the set temperature of 25° C. in the automatic mode (AUTO) is performed in step S420, the set temperature may be set arbitrarily when the passenger sets the estimated time of departure for the preliminary air conditioning. In this case, the set temperature in step S420 and in step S470 to be described later is the temperature set by the passenger.

Meanwhile, in step S430, the A/C controller 20 does not turn on the compressor 9. Here, according to one or more embodiments of the present invention, it is possible to reduce $\Delta t2$ and to more reliably remove the window fogging by turning the compressor 9 on and performing the operation while carrying out dehumidification with the interior heat exchanger 6.

In step S440, the A/C controller 20 judges whether or not the compressor 9 is turned on for the operation using the interior heat exchanger 6 as the heat absorber. The process proceeds to step S450 when the interior heat exchanger 6 is operated as the heat absorber. The process proceeds to step S470 when the interior heat exchanger 6 is not operated as the heat absorber.

In step S450, the A/C controller 20 sets the flag Fcomp.on for representing that the compressor 9 is turned on to 1, and the process proceeds to step S460.

In step S460, the A/C controller 20 counts up the timer Tcomp.on for counting the cumulative operating time period of the compressor 9, and the process proceeds to step S470. Since the timer Tcomp.on is reset to 0 only at the point immediately after the ignition is on in step S260, the A/C controller 20 starts counting up in step S460 from the value before the start of the preliminary air conditioning (before the ignition is off). In this way, the A/C controller 20 can accumulate the time period in which the interior heat exchanger 6 is operated as the heat absorber in the ordinary operation as well as in the preliminary air conditioning thereafter.

In step S470, the A/C controller 20 operates the vehicle air-conditioning system by setting the inside air recirculation mode (REC), the set temperature at 25° C., and the automatic mode (AUTO).

(Correction of Δt1 (First Predetermined Time Period) and Δt2 (Second Predetermined Time Period))

Figure 5:
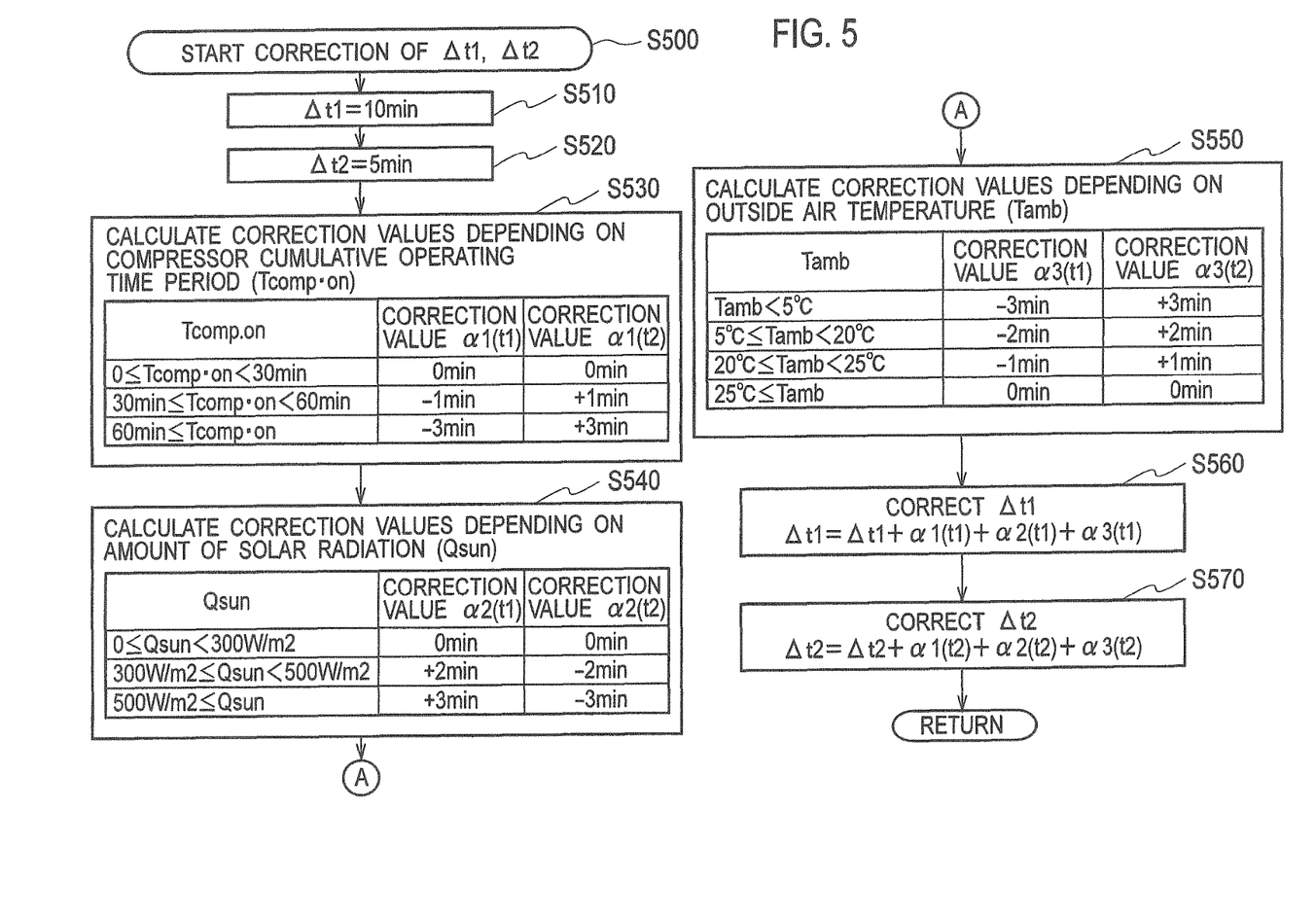
FIG. 5 is a control flowchart explaining procedures for correcting time $\Delta t1$ and time $\Delta t2$ according to one or more embodiments of the present invention.

FIG. 5 shows a flow to correct Δt1 (the first predetermined time period) and Δt2 (the second predetermined time period) in step S380 and step S390.

Instep S510, the A/C controller 20 sets a time period constituting an initial value for Δt1. Here, Δt1 is set equal to 10 minutes. In step S520, the A/C controller 20 sets a time period constituting an initial value for Δt2. Here, Δt2 is set equal to 5 minutes.

In step S530, the A/C controller 20 calculates a correction value α1 (t1) for Δt1 and a correction value Δ1 (t2) for Δt2 depending on the timer Tcomp.on that counts the cumulative operating time period of the compressor 9. As the timer Tcomp.on is greater, the amount of the condensed water (drain) adhering to the interior heat exchanger 6 grows larger. Accordingly, the correction values are set such that Δt1 becomes smaller while Δt2 becomes larger along with an increase in the timer Tcomp.on. In one or more embodiments of the present invention, each correction value is selected from options which are stored in a table in advance and categorized by three groups of the compressor cumulative operating time period Tcomp.on of less than 30 minutes, equal to or above 30 minutes but less than 60 minutes, and equal to or above 60 minutes. Nonetheless, such options are not limited to three categories and may include categories in any other number. Alternatively, each correction value may be calculated from the value of the timer Tcomp.on based on a calculation formula stored in advance.

In step S540, the A/C controller 20 calculates a correction value α2 (t1) for Δt1 and a correction value α2 (t2) for Δt2 depending on the amount of solar radiation (Qsun) detected in step S220. As the amount of solar radiation is greater, the window fogging is less likely to occur. Accordingly, the correction values are set such that Δt1 becomes larger while Δt2 becomes smaller along with an increase in the amount of solar radiation. In one or more embodiments of the present invention, each correction value is selected from options which are stored in a table in advance and categorized by three groups of the amount of solar radiation (Qsun) of less than 300 W/m², equal to or above 300 W/m² but less than 500 W/m², and equal to or above 500 W/m². Nonetheless, such options are not limited to three categories and may include categories in any other number. Alternatively, each correction value may be calculated from the value of the amount of solar radiation (Qsun) based on a calculation formula stored in advance.

In step S550, the A/C controller 20 calculates a correction value α3 (t1) for Δt1 and a correction value α3 (t2) for Δt2 depending on the outside air temperature (Tamb) detected in step S220. As the outside air temperature is lower, the window fogging is more likely to occur. Accordingly, the correction values are set such that Δt1 becomes smaller while Δt2 becomes larger along with a drop in the outside air temperature. In one or more embodiments of the present invention, each correction value is selected from options which are stored in a table in advance and categorized by four groups of the outside air temperature (Tamb) of below 5° C., equal to or above 5° C. but below 20° C., equal to or above 20° C. but below 25° C., and equal to or above 25° C. Nonetheless, such options are not limited to four categories and may include categories in any other number Alternatively, each correction value may be calculated from the value of the outside air temperature (Tamb) based on a calculation formula stored in advance.

In step S560, the A/C controller 20 corrects Δt1 (the first predetermined time period) by using the correction values calculated in step S530 to step S550. In step S570, the A/C controller 20 corrects Δt2 (the second predetermined time period) by using the correction values calculated in step S530 to step S550.

In one or more embodiments of the present invention, when there is a request for heating the inside of the vehicle cabin in the preliminary air conditioning, the switching between the inside air recirculation mode for the first predetermined time period and the outside air introduction mode for the second predetermined time period is alternately performed by controlling the intake door. This makes it possible to allow a passenger who gets in the vehicle before the preset estimated time of departure to put the vehicle in motion immediately without being bothered by the window fogging.

In one or more embodiments of the present invention, the initial value for the first predetermined time period is set longer than the initial value for the second predetermined time period. For this reason, one or more embodiments of the present invention may adopt the inside air recirculation mode as a basic operation, thereby reducing heat loss by ventilation and suppressing power consumption.

In one or more embodiments of the present invention, the preliminary air-conditioning controlling means is configured to determine time to start activation of the heating means on the basis of either the temperature inside the vehicle cabin or the outside air temperature, and of the estimated time of departure. For this reason, one or more embodiments of the present invention may offer the preliminary air conditioning with no window fogging while not providing a judgment control logic using a humidity sensor or a humidity detection value.

One or more embodiments of the present invention is configured to perform the operation in the outside air introduction mode only when the cooling means is operated before the ignition is off or during the preliminary air conditioning. For this reason, one or more embodiments of the present invention may avoid the window fogging attributed to the condensed water on a surface of the interior heat exchanger, and to reduce the heat loss by ventilation and to suppress the power consumption when there is no condensed water.

One or more embodiments of the present invention is configured to correct the first predetermined time period and the second predetermined time period depending on the cumulative operating time period of the cooling means before the ignition is off and during the preliminary air conditioning. For this reason, one or more embodiments of the present invention may correct the operating time period in the inside air recirculation mode and the operating time period in the outside air introduction mode depending on the amount of liquefied water adhering to the interior heat exchanger, thereby reducing the heat loss by ventilation and suppressing the power consumption.

One or more embodiments of the present invention is configured to correct the first predetermined time period and the second predetermined time period depending on the amount of solar radiation detected by the solar radiation sensor. For this reason, one or more embodiments of the present invention may perform the correction so as to set the operating time period in the inside air recirculation, mode longer and the operating time period in the outside air introduction mode shorter in a condition where the amount of solar radiation is large and the window fogging is less likely to occur, thereby further reducing the heat loss by ventilation and suppressing the power consumption.

One or more embodiments of the present invention is configured to correct the first predetermined time period and the second predetermined time period depending on the outside air temperature detected by the outside air temperature sensor. For this reason, one or more embodiments of the present invention may perform the correction so as to set the operating time period in the inside air recirculation mode shorter and the operating time period in the outside air introduction mode longer in a condition where the outside air temperature is low and the window fogging is more likely to occur, thereby reliably avoiding occurrence of the window fogging, as well as reducing the heat loss by ventilation and suppressing the power consumption.

One or more embodiments of the present invention provides a vehicle air-conditioning system and a vehicle air-conditioning method, which can avoid occurrence of window fogging when heating is performed in air conditioning, thereby allowing a driver to put a vehicle in motion as soon as getting in the vehicle before estimated time of departure.

The present invention is not limited only to the above-described embodiments but may be modified as appropriate.

While the invention has been described with respect to a limited number of embodiments, those skilled in the art, having benefit of this disclosure, will appreciate that other embodiments can be devised which do not depart from the scope of the invention as disclosed herein.

Accordingly, the scope of the invention should be limited only by the attached claims.

REFERENCE SIGNS LIST 1 inside air introduction port
2 outside air introduction port
3 Intake door (inside-outside air switching means)
5 blower fan (blowing means)
6 interior heat exchanger (cooling means)
8 condenser (cooling means)
9 compressor (cooling means)
10 heater core (heating means)
11 electric water pump (heating means)
12 PTC heater (heating means)
13 air mix door
15 outside air temperature sensor
16 inside temperature sensor
17 solar radiation sensor
20 A/C controller (air-conditioning controlling means, preliminary air-conditioning controlling means)

The invention claimed is:

1. A vehicle air-conditioning system comprising:
an intake door that switches between an inside air recirculation mode to take in air from an inside air introduction port and an outside air introduction mode to take in air from an outside air introduction port;
a blower that blows the air introduced through any of the inside air introduction port and the outside air introduction port toward inside of a vehicle cabin;
a heater that heats the air blown by the blower;
a controller that:
activates the heater when there is a request for heating the inside of the vehicle cabin,
performs preliminary air conditioning in which air conditioning is controlled such that an environment inside the vehicle cabin becomes a desired environment by set estimated time of departure, and
controls the intake door when there is the request for heating the inside of the vehicle cabin in the preliminary air conditioning, in such a way as to alternately switch between the inside air recirculation mode for a first predetermined time period and the outside air introduction mode for a second predetermined time period; and
a heat exchanger that cools the air blown by the blower,
wherein the controller performs an operation in the outside air introduction mode for the second predetermined time period when the heat exchanger is operated during the preliminary air conditioning,
wherein the controller performs an operation in the inside air recirculation mode for the second predetermined time period when the heat exchanger is not operated during the preliminary air conditioning, and
wherein the preliminary air conditioning is air conditioning performed before ignition is turned on.

2. The vehicle air-conditioning system according to claim 1, wherein an initial value for the first predetermined time period is set longer than an initial value for the second predetermined time period.

3. The vehicle air-conditioning system according to claim 1, wherein the controller determines time to start activation of the heater on the basis of any one of a temperature inside the vehicle cabin and an outside air temperature, and on the basis of the estimated time of departure.

4. The vehicle air-conditioning system according to claim 1, wherein the first predetermined time period and the second predetermined time period are corrected depending on a cumulative operating time period of the heat exchanger before ignition is off and during the preliminary air conditioning.

5. The vehicle air-conditioning system according to claim 1, further comprising:
a solar radiation sensor that detects an amount of solar radiation,
wherein the first predetermined time period and the second predetermined time period are corrected depending on a detected amount of solar radiation.

6. The vehicle air-conditioning system according to claim 1, further comprising:
an outside air temperature sensor that detects an outside air temperature,
wherein the first predetermined time period and the second predetermined time period are corrected depending on a detected outside air temperature.

7. A vehicle air-conditioning method performed by a controller, comprising:
judging whether or not to perform preliminary air conditioning in which air conditioning is controlled such that an environment inside a vehicle cabin becomes a desired environment by estimated time of departure;
judging whether or not there is a request for heating an inside of the vehicle cabin when the preliminary air conditioning is performed;

switching alternately between an inside air recirculation mode to take in air from an inside air introduction port for a first predetermined time period and an outside air introduction mode to take in air from an outside air introduction port for a second predetermined time period when there is the request for heating the inside of the vehicle cabin, and heating the air taken in through any of the inside air introduction port and the outside air introduction port;

blowing the heated air toward the inside of the vehicle cabin; and cooling the blown air with a heat exchanger, wherein an operation in the outside air introduction mode is performed for the second predetermined time period when the blown air is cooled with the heat exchanger during the preliminary air conditioning, wherein an operation in the inside air recirculation mode is performed for the second predetermined time period when the blown air is not cooled with the heat exchanger during the preliminary air conditioning, and wherein the preliminary air conditioning is air conditioning performed before ignition is turned on.

* * * * *